2,850,465
POLYMERIC ALKENYLARYLOXYACETIC ACID

Gaetano F. D'Alelio, Pittsburgh, Pa., assignor to Koppers Company, Inc., a corporation of Delaware No Drawing. Application October 20, 1954
Serial No. 463,611

10 Claims. (Cl. 260—2.5)

This application is concerned with polymeric alkenylaryloxyacetic acids. These polymers are useful for a variety of purposes such as, for example, sizings, in the preparation of freeze-proof emulsions and water-redispersible polymers, as polymers for coatings and adhesives and as scavengers in synthetic detergents. Further, the polymers can be cross-linked to produce thermoset resins by curing, for example, with polyisocyanates or polyoxirane compounds, which thermoset resins are useful for molding, laminating and the like. It is to be noted that stable cellular compositions can be prepared from polymers of this invention containing hereinafter described proportions of polymeric alkenylaryloxyacetic acids by the raction with isocyanates which reaction produces carbon dioxide which acts as the expanding agent. Additionally, these resins when cross-linked, for example by a polyfunctional ethylenically unsaturated agent, exhibit ion-exchange properties.

The invention is particularly concerned with a polymeric alkenylaryloxyacetic acid having a plurality of repeating units of the formula

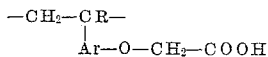

in which R is chosen from the class consisting of hydrogen and methyl and Ar is an arylene group.

As used herein the term "polymer" embraces both homopolymers and copolymers. The term "copolymer" as used herein embraces polymeric materials derived from the polymerization of two or more monomeric materials. That is, 2, 3, 4, 5 . . . ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following preferred embodiments:

Example I

A cold solution of sodium 2-vinylphenolate is prepared from 90 parts 2-vinylphenol, 20 parts sodium hydroxide and 350 parts water. This is added over a period of approximately 1 hour with stirring to a 50 percent solution of sodium bromoacetate in water at 75° C. Thereafter the mixture is stirred for an additional hour at 85° C. The mixture is acidified with dilute hydrochloric acid to a pH of approximately 2 whereupon there is obtained 2-vinylphenoxyacetic acid which is removed by filtration. The acid is recrystallized from carbon tetrachloride.

A 7 percent solution of this acid in dry xylene is prepared and there is added 3 per cent benzoyl peroxide based on the acid. The mixture is cooled to the temperature of a Dry Ice bath and the atmosphere alternately evacuated and filled with nitrogen. Polymerization is carried out under an atmosphere of nitrogen at 110° C. for approximately 18 hours. The xylene is removed by vacuum distillation. There is obtained homopolymeric 2-vinylphenoxyacetic acid.

Example II

A cold solution of sodium 4-isopropenylphenolate is prepared from 70 parts 4-isopropenylphenol, 16 parts sodium hydroxide and 400 parts water. This is added with stirring over a period of approximately 1 hour to a 50 percent solution of sodium bromoacetate in water at 4° C. The stirring is continued for an additional hour at 4° C. and the solution allowed to stand overnight at minus 6° C. The mixture is acidified with dilute hydrochloric acid to approximately pH 2 and the mixture extracted with ether. The ether is removed by evaporation and the residue recrystallized from carbon tetrachloride. There is obtained 4-isopropenylphenoxyacetic acid.

This acid is polymerized according to the procedure set forth in Example I. There is obtained homopolymeric 4-isopropenylphenoxyacetic acid.

Similarly, linear, soluble polymers of various alkenylaryloxyacetic acids such as 3-vinylphenoxyacetic acid, 4-vinylphenoxyacetic acid, 3-isopropenylphenoxyacetic acid, and the vinyl- and isopropenyl-1- and 2-naphthylacetic acids can be obtained following the procedure of Example I.

Example III 7 parts 2-vinylphenoxyacetic acid, 63 parts styrene, and 0.5 percent benzoyl peroxide based on the monomers are dissolved in 1000 parts dry xylene, and polymerization is carried out as described in Example I, except that the heating period is 15 hours at 80° C. There is obtained a clear, light yellow solid. The product is soluble in ethylene dichloride and toluene at least to the extent of 1 to 100 parts solvent. It is insoluble in water, 10 percent sodium hydroxide, methanol and 95 per cent ethanol at the same product/solvent ratio. One part product and 100 parts acetone forms an emulsion.

Example IV

Example III is repeated substituting for the styrene there used a similar quantity of butadiene. There is obtained a copolymer soluble in toluene.

Example V

Example III is repeated substituting for the styrene there used an equal quantity of acrylonitrile. There is obtained a polymer soluble in dimethylformamide.

Example VI

Example III is repeated substituting for the styrene there used a similar quantity of maleic anhydride. There is obtained a polymer soluble in toluene, and having an acid number of approximately 1000.

Example VII

Example III is repeated substituting for the styrene there used a similar quantity of methyl methacrylate. There is obtained a polymer soluble in toluene.

Example VIII

Example III is repeated substituting for the reactants there utilized 7 parts 4-isopropenylphenoxyacetic acid and 63 parts styrene. There is obtained a waxy solid which is soluble in 1 part per 100 parts toluene, which forms an emulsion with acetone at the same product/solvent ratio and which is insoluble in water, 10 percent sodium hydroxide, methanol, and 95 percent ethanol at the same product/solvent ratios.

Example IX

Example VIII is repeated substituting for the styrene there used a similar quantity of butadiene. There is obtained a polymer soluble in toluene.

Example X

Example VIII is repeated substituting for the styrene there used a similar quantity of acrylonitrile. There is obtained a polymer soluble in dimethylformamide.

Example XI

Example VIII is repeated substituting for the styrene there used a similar quantity of maleic anhydride. There is obtained a polymer soluble in toluene.

Example XII

Example VIII is repeated substituting for the styrene there used a similar quantity of methyl methacrylate. There is obtained a polymer soluble in toluene.

While the foregoing examples III to XII illustrate the copolymerization of 2-vinylphenoxyacetic acid and 4-isopropenylphenoxyacetic acid with various copolymerizable ethylenic monomers it will be realized that the various alkenylaryloxyacetic acids can be substituted for the particular compound utilized in those examples to yield copolymers. Further, there can be utilized mixtures of two or more alkenylaryloxyacetic acids in the preparation of copolymers either alone or in combination with a copolymerizable ethylenically unsaturated monomer, or mixtures of two or more copolymerizable ethylenic unsaturated monomers.

It is to be noted that for benzoyl peroxide utilized in the foregoing examples there can be substituted a variety of peroxy-catalysts such as hydrogen, acetyl, acetyl-benzoyl, phthalyl and lauroyl peroxides, tertiary-butyl hydroperoxides, etc., and other percompounds, for example ammonium persulfate, sodium persulfate, sodium perchlorate and the like.

Example XIII

One hundred parts of the polymer of Example III is admixed with 10 parts of the diglycidyl ether of bisphenol and 1 percent ethylenediamine and the mixture warmed gently. There is obtained a thermoset resin.

Example XIV

Example XIII is repeated utilizing in place of the diglycidyl ether of bisphenol an equal weight of the resin described at column 7 of my U. S. Patent 2,658,885, granted Nov. 10, 1953. There is obtained a thermoset resin.

It will be realized that the various epoxyalkoxy phydrocarbon substituted phenol aldehyde resins described in that patent can be utilized in the foregoing procedure. Additionally the epoxyalkoxy chlorine substituted phenol aldehyde resins described in my U. S. Patent 2,658,884, granted Nov. 10, 1953, can be utilized in the foregoing procedure.

It will be understood that in place of the ethylenediamine catalyst utilized in Examples XIII and XIV there can be substituted equivalent portions of such amine catalysts as tetrahydroquinoline and piperidine to obtain substantially similar results.

There can be substituted for the polymer utilized in Example XIII and XIV similar quantities of the various polymers of this invention, that is, polymers of alkenylaryloxyacetic acids.

Example XV

Following the procedure of Example III 50 parts 2-vinyl-phenoxyacetic acid and 250 parts styrene are polymerized. There is obtained a solid which is comminuted and admixed with 150 parts 2,4-toluenediisocyanate and placed in a mold having void space for expansion. The mixture is heated rapidly to 110° C. and there is produced a cross-linked cellular polymer.

For the copolymer used in the foregoing procedure there can be substituted copolymers of styrene and vinylphenoxyacetic acid in which the styrene/phenoxyacetic acid ratio in parts by weight is from approximately 3:1 to approximately 10:1. Similarly, copolymers of styrene and the other alkenylaryloxyacetic acids described herein can be utilized in which the styrene/aryloxyacetic acid ratio is in approximately the aforedescribed range. Further, other copolymers of ethylenically unsaturated monomers which do not contain carboxyl or carboxyl-producing groups (i. e. anhydrides) can be utilized to produce cellular structures.

In place of the 2,4-toluenediisocyanate utilized above there can be substituted other diisocyanates such as phenylene diisocyanate; 2,6-toluenediisocyanate; 1,5-napythalenediisocyanate; 1-chloro-1-phenylene-2,4-diisocyanate; 4,4'-xenylenediisocyanate; tetramethylenediisocyanate and the like. The amount of these diisocyanates utilized is governed by the degree of cross-linking desired.

In general, desirable results are obtained when the diisocyanate is utilized in approximately 40 to 120 parts per 100 parts copolymer.

Example XVI

Ninety-eight parts 2-vinylphenoxyacetic acid, 2 parts divinylbenzene and 0.5 percent benzoyl peroxide based on the monomers are dissolved in 1000 parts dry xylene and the polymerization carried out as in Example I. The insoluble, infusible polymer possesses ion-exchange properties. The product is comminuted and tested as described in Example XVII.

Example XVII

One hundred parts of the comminuted polymer of Example XVI are admixed with 1000 parts distilled water and 2000 parts standardized sodium hydroxide solution and the mixture agitated. After approximately one-half hour the resin is removed by filtration and the filtrate tested for the presence of sodium hydroxide by analytical titration. The efficiency of the resin as an ion-exchange body is determined by calculating the ratio of sodium ions actually removed from the solution to the ions theoretically removed. A good ion-exchange is indicated by calculations which show that approximately each of the calculated carboxyl groups of the copolymer removes a sodium ion from the solution.

It will be realized that the various cross-linked polymers of this invention possess ion-exchange properties, the degree varying with the number of carboxyl groups present in the polymer.

It will be realized that while the foregoing examples have been directed to certain vinyl- and isopropenyl-phenoxyacetic acids, the invention is applicable broadly to alkenylaryloxyacetic acids of the formula

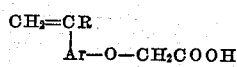

in which R is chosen from the group consisting of hydrogen and methyl and Ar is an arylene radical illustrated by such as, for example, phenylene, tolylene, naphthylene and the like.

While the invention has been described with reference to particular embodiments thereof, it will be understood that in its broadest aspects the invention may be variously embodied within the scope of the invention as set forth herein and in the appended claims.

What it claimed is:

1. A polymer of an alkenylaryloxyacetic acid having the formula:

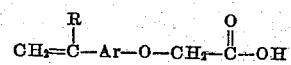

wherein R is chosen from the class consisting of hydrogen and methyl and Ar is an arylene radical.

2. A homopolymer of 2-vinylphenoxyacetic acid.

3. A homopolymer of 4-isopropenylphenoxyacetic acid.

4. A copolymer of an alkenylaryloxyacetic acid having the formula:

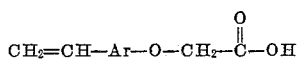

wherein Ar is an arylene radical, and at least one other copolymerizable ethylenically unsaturated monomer.

5. A copolymer of claim 4 wherein the copolymerizable ethylenically unsaturated monomer is selected from the group consisting of styrene, butadiene, acrylonitrile, maleic acid and methyl methacrylate.

6. An insoluble copolymer of claim 4, the acid groups of said copolymer being cross-linked with a material selected from the group consisting of an organic diisocyanate and a polyepoxy compound.

7. A foamed product of claim 6 wherein said copolymerizable unsaturated monomer is styrene and said material is an organic diisocyanate, the mole ratio of styrene to acid being from about 3:1 to 10:1 and the diisocyanate being present in an amount ranging from 40 to 120 parts per 100 parts copolymer.

8. A copolymer of an alkenylaryloxyacetic acid having the formula:

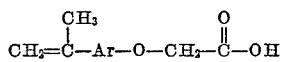

wherein Ar is an arylene radical, and at least one other copolymerizable ethylenically unsaturated monomer.

9. An insoluble copolymer of claim 8, the acid groups of said copolymer being cross-linked with a material selected from the group consisting of an organic diisocyanate and a polyepoxy compound.

10. A copolymer of claim 8 wherein the copolymerizable ethylenically unsaturated monomer is selected from the group consisting of styrene, butadiene, acrylonitrile, maleic acid and methyl methacrylate.

References Cited in the file of this patent

UNITED STATES PATENTS

| | | |
|---|---|---|
| 2,157,126 | Harvey | May 9, 1939 |
| 2,181,119 | Caplan | Nov. 28, 1939 |
| 2,317,586 | Caplan | Apr. 27, 1943 |
| 2,642,403 | Simon et al. | June 16, 1953 |
| 2,672,478 | Rust et al. | Mar. 16, 1954 |
| 2,740,743 | Pace | Apr. 3, 1956 |

OTHER REFERENCES

Fries et al.: Berichte Deut. Chem. Gesel., volume 41, page 370, 1908.

Auwers: Liebigs Annalen der Chemie, volume 413, pages 306–308, 1917.

Bonsall et al.: Trans. For. Soc., volume 48, August 1952, pages 763–773.